United States Patent
Habiba et al.

(10) Patent No.: US 11,902,331 B2
(45) Date of Patent: Feb. 13, 2024

(54) REQUEST AUTHORIZATION (71) Applicant: KYNDRYL, INC., New York, NY (US)

(72) Inventors: Mansura Habiba, Jhonstown (IE); Shyamal Kumar Saha, Dublin (IE); Bashar Akil, Wroclaw (PL); Utz Bacher, Dettenhausen (DE)

(73) Assignee: KYNDRYL, INC., New York, NY (US)

( * ) Notice: Subject to any disclaimer, the term of this patent is extended or adjusted under 35 U.S.C. 154(b) by 142 days.

(21) Appl. No.: 17/396,212

(22) Filed: Aug. 6, 2021

(65) Prior Publication Data

US 2023/0039176 A1 Feb. 9, 2023

(51) Int. Cl.
*H04L 29/06* (2006.01)
*H04L 9/40* (2022.01)

(52) U.S. Cl.
CPC .......... *H04L 63/20* (2013.01); *H04L 63/0884* (2013.01); *H04L 63/10* (2013.01)

(58) Field of Classification Search
CPC ..... H04L 63/0884; H04L 63/20; H04L 63/10; H04L 63/0263; H04L 63/0457; H04L 63/6308
USPC .......................................................... 726/1
See application file for complete search history.

(56) References Cited

U.S. PATENT DOCUMENTS

| | | | | |
|---|---|---|---|---|
| 8,121,291 | B2* | 2/2012 | Terekhova | H04N 21/25816 713/168 |
| 9,946,984 | B2* | 4/2018 | Ahari | H04L 63/0414 |
| 11,375,300 | B2* | 6/2022 | Sagie | H04Q 11/0071 |
| 2016/0124742 | A1 | 5/2016 | Rangasamy et al. | |

OTHER PUBLICATIONS

Bonnet et al., "Service Programming and Orchestration for Virtualized Software Networks," https://bscw.5g-ppp.eu/pub/bscw.cgi/137267?op=preview&back_url=46779, Dec. 23, 2016, 113 pgs.

Mell et al., "The NIST Definition of Cloud Computing," Recommendations of the National Institute of Standards and Technology, U.S. Department of Commerce, Special Publication 800-145, Sep. 2011, 7 pgs.

Stafford, G., "Istio Observability with Go, gRPC, and Protocol Buffers-based Microservices," https://programmaticponderings.com/tag/istio/, Apr. 17, 2019, 247 pgs.

Unknown, "Microservices Security Using JWT Authentication Gateway," https://www.xoriant.com/blog/product-engineering/microservices-security-using-jwt-authentication-gateway.html, Aug. 28, 2018, 13 pgs.

(Continued)

*Primary Examiner* — Longbit Chai
(74) *Attorney, Agent, or Firm* — Dan Housley; Andrew M. Calderon; Calderon Safran & Cole P.C.

(57) ABSTRACT

A computer implemented method for generating a dispatch datagram is disclosed. The computer implemented method includes receiving, at a dispatcher, a request from a client. The method further includes generating an authorization header based on the received request. The authorization header includes one or more rules for handling the request. The method further includes wrapping the received request and the generated authorization header together to generate a dispatch datagram.

20 Claims, 7 Drawing Sheets

(56) References Cited

OTHER PUBLICATIONS

Unknown, "Service mesh and microservices networking," https://www.hashicorp.com/resources/service-mesh-microservices-networking, Sep. 17, 2018, 13 pgs.
Unknown, "Serverless Functions security," https://docs.microsoft.com/en-us/azure/architecture/serverless-quest/functions-app-security, Jun. 22, 2020, 5 pgs.

* cited by examiner

REQUEST AUTHORIZATION

BACKGROUND

The present disclosure generally relates to the field of distributed processing systems, and more particularly, systems and methods for request handling in distributed processing systems.

In typical cloud architectures, a plurality of different services may be available for performing different functions. Indeed, it is common practice in modern cloud architecture to have a mesh of services, or microservices, which may be able to call each other and may be accessible from outside of the cloud architecture by third parties.

SUMMARY

Embodiments of the present disclosure include a computer implemented method for generating a dispatch datagram. The computer implemented method includes receiving, at a dispatcher, a request from a client. The method further includes generating an authorization header based on the received request. The authorization header includes one or more rules for handling the request. The method further includes wrapping the received request and the generated authorization header together to generate a dispatch datagram.

Embodiments of the present disclosure include a computer implemented method for authorizing a request from a client. The method includes receiving a dispatch datagram at a first validator. The dispatch datagram includes a request and an authorization header. The first validator is adapted to provide access to a first service. The method includes separating the request and the authorization header from the dispatch datagram. The method includes determining, by the first validator, whether the first service is authorized to receive the request based on the authorization header.

Embodiments of the present disclosure include a computer implemented method for handling a dispatch datagram comprising a request from a client and an authorization header wrapped together. The authorization header includes one or more rules for handling the request. The method includes receiving the dispatch datagram at a first validator. The first validator is adapted to provide access to a first service. The method includes separating the request and the authorization header from the dispatch datagram. The method includes determining, by the first validator, whether the first service is authorized to receive the request based on the authorization header. The method includes sending only the request to the first service when the first service is determined to be authorized to receive the request. The method includes rejecting the request when the first service is not determined to be authorized to receive the request.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

DETAILED DESCRIPTION

It should be understood that the figures are merely schematic and are not drawn to scale. It should also be understood that the same reference numerals are used throughout the figures to indicate the same or similar parts.

In the context of the present disclosure, where embodiments of the present disclosure constitute a method, it should be understood that such a method is a process for execution by a computer; in other words, is a computer-implementable method. The various operations of the method therefore reflect various parts of a computer program; for example, various parts of one or more algorithms.

Also, in the context of the present disclosure, a (processing) system may be a single device or a collection of distributed devices that are adapted to execute one or more embodiments of the methods of the present disclosure. For instance, a system may be a personal computer (PC), a server or a collection of PCs and/or servers connected via a network such as a local area network, the Internet and so on to cooperatively execute at least one embodiment of the methods of the present disclosure.

Also, in the context of the present disclosure, a system may be a single device or a collection of distributed devices that are adapted to execute one or more embodiments of the methods of the present disclosure. For instance, a system may be a personal computer (PC), a portable computing device (such as a tablet computer, laptop, smartphone, etc.), a set-top box, a server, or a collection of PCs and/or servers connected via a network such as a local area network, the Internet and so on to cooperatively execute at least one embodiment of the methods of the present disclosure.

In order to maintain the security of the cloud environment, a service needs to know whether a request is authorized when called. Without such an authorization check, the cloud environment would be unsecure and easily compromised.

An authorization check is often implemented through an inquiry of the request through an authorization server, for example, to confirm that a token of the request is valid. This authorization check adds complexity and latency, particularly if an end user's request to a front end service is implemented behind the scenes through several services.

Further, if implemented correctly, a conventional authorization check is performed at the beginning of the request processing before other parameters are evaluated. However, if this procedure is not strictly adhered to, any vulnerability, such as through parameters in invalid format, might allow an attacker to modify the service's behavior before the authorization is evaluated.

A typical request can include many function calls directed towards different services, each of which may be interlinked as part of the cloud architecture. Should any of the services be individually compromised, leading to an unauthorized authentication, then any of the subsequent services called by the request may also be compromised. Put another way, the security of a system with a cloud architecture with a conventional means of request authorization is only as strong as the security of an individual service.

The technical character of the present disclosure generally relates to distributed processing systems, and more particularly, systems and methods for request handling in distributed processing systems. More specifically, embodiments of the present disclosure provide concepts for generating a dispatch datagram by receiving a request from a client at a dispatcher and generating an authorization header based on the received request by way of the dispatcher. The dispatcher may also be referred to herein as a distributor. The authorization header comprises one or more rules for handling the request. The received request and the generated authorization header are then wrapped together, thereby generating a dispatch datagram.

Put another way, the disclosure proposes a concept of packaging a request with a customized authorization header relating to that request. By way of example, upon receipt of the request at the system, the request is provided to a dispatcher that generates an authorization header for the request. The request and the authorization header are wrapped into a dispatch datagram and may then be directed toward the relevant service to process the request. The generation of an authorization header that is individual to each received request provides a way to authorize requests from a client in a more secure manner.

In an embodiment, the authorization header may be unencrypted, and the request may be encrypted. In this way, system latency may be reduced by removing the need to decrypt the authorization header without compromising the security of the system as the authorization header remains at a validation layer and cannot be altered through the service. Further, the request may remain secure when passing from the validator to the service for processing.

In an embodiment, the request may comprise a token, and the method may further comprise validating the token by way of the dispatcher. For example, validating the token may comprise communicating with an authorization server to determine whether the token is valid. The generation of the authorization header may be further based on the authorized token. In this way, a request may be validated before being passed to the internal validators of the system, thereby improving the security of the authorization method. Further, the authorization header may include additional information that may be utilized by the validator to authorize the request, thereby improving the security of the authorization method.

In an embodiment, the method may further comprise obtaining a policy from a policy database. The policy may comprise request permissions and the generation of the authorization header may be further based on the policy. In this way, the authorization header may include additional policy information that may be utilized by the validator to authorize the request, thereby improving the security of the authorization method. Further, the authorization header may obtain the most recently updated policy from the policy database, meaning the authorization may remain up to date with the most current policy in a dynamic fashion, thereby improving the security of the authorization method further.

Embodiments may further provide a computer implemented method for authorizing a request from a client. The method may include receiving a dispatch datagram at a first validator adapted to provide access to the first service, the dispatch datagram having been generated according to the methods described above. The method may further comprise separating the request and the authorization header from the dispatch datagram and determining, by way of the first validator, whether the first service is authorized to receive the request based on the authorization header. If the first service is determined to be authorized to receive the request, only the request may be sent to the first service. If the first service is not determined to be authorized to receive the request, the request may be rejected.

In other words, the disclosure may provide a way to authorize a request, or function call, from a client to a service. Put another way, the disclosure may provide an authorization method for a request to access a function of a service in a distributed system.

In order to access the service, the dispatch datagram must pass through a validator, which exists on a layer outside of the service itself. The dispatch datagram is unwrapped by the validator and the authorization header may be checked to determine whether the request is authorized to be passed to the service. If the validator determines that the request is authorized, only the request is passed to the service for processing and the authorization header may remain at the layer of the validator, separate from the service. As the authorization, performed by the validator using the authorization header, and the workload, the processing of the request by the service, are decoupled, the security of the authorization process is improved as the services, which may belong to third parties in some cases, do not see the authorization header and the validators perform the correct checks before the request is released to the service.

Accordingly, even in the case where a service has been compromised, any malicious intrusion is not able to change the authorization header of the request to gain further access to the system because the authorization header is outside of the powers of the service. Further, the method of the disclosure may result in a reduction in latency and traffic compared to conventional methods of authorization because the number of conventional token requests and verifications is reduced. Thus, the method may provide a way to authorize a request from a client to service in a more efficient and more secure manner.

According to an embodiment, the authorization header may be inaccessible by the first service, meaning that the authorization header is kept separate from the service, thereby improving the security of the authorization method.

In an embodiment, the first service upon processing the request may generate a first output to be processed by a second service. The method may further comprise receiving the first output of the first service at the first validator and wrapping the first output from the first service with the authorization header by way of the first validator, thereby generating an output datagram. The output datagram may then be received at a second validator, the second validator being adapted to provide access to the second service, and the first output and the authorization header may be separated from the output datagram. It may then be determined whether the second service is authorized to receive the first output based on the authorization header by way of the second validator. If the second service is determined to be authorized to receive the first output, only the first output may be sent to the second service. If the second service is not determined to be authorized to receive the first output, the first output may be rejected.

Where a first service generates an output to be processed by another, different service, the method may require that the output of the first service is re-wrapped with the authorization header of the original request before being sent from the first validator, associated with the first service, to a second validator, associated with the second service. The process of validating the authorization header to permit the output of the first service to be processed by the second service may be similar to the process for validating the authorization header to permit the original request to be processed by the first service.

Put another way, a validator, or validation layer, may be provided before each service of the system, which may wrap any outputs of the services with the authorization header before sending the outputs on and will validate any incoming requests based on the attached authorization header before passing the requests on to the services. In this way, the security of the authorization method may be further improved as inter-service communication without individual authorization between each step may be prevented from occurring.

The present disclosure provides a method of generating a dispatch datagram comprising a request and an authorization header wrapped together. The present disclosure also provides a method for handling a dispatch datagram comprising a request from a client and an authorization header wrapped together. Such methods may be computer-implemented. That is, such methods may be implemented in a computer infrastructure having computer executable code tangibly embodied on a computer readable storage medium having programming instructions configured to perform a proposed method. The present disclosure further provides a computer program product including computer program code for implementing the proposed concepts when executed on a processor. The present disclosure yet further provides a system for generating a dispatch datagram comprising a request and an authorization header wrapped together. The disclosure also provides a system for handling a dispatch datagram comprising a request from a client and an authorization header wrapped together.

According to an aspect of the present disclosure there is provided a method of generating a dispatch datagram. The method includes receiving a request from a client at a dispatcher and generating an authorization header based on the received request by way of the dispatcher. The authorization header comprises one or more rules for handling the request. The method further includes wrapping the received request and the generated authorization header together, thereby generating a dispatch datagram.

According to another aspect of the present disclosure, there is provided a method for handling a dispatch datagram comprising a request from a client and an authorization header wrapped together. The authorization header comprises one or more rules for handling the request. The method includes receiving the dispatch datagram at a first validator, the first validator being adapted to provide access to a first service, and separating the request and the authorization header from the dispatch datagram. It is then determined, by way of the first validator, whether the first service is authorized to receive the request based on the authorization header. If the first service is determined to be authorized to receive the request, only the request is sent to the first service. If the first service is not determined to be authorized to receive the request, the request is rejected.

Embodiments may be employed in combination with conventional/existing request handling systems. In this way, embodiments may integrate into legacy systems so as to improve and/or extend their functionality and capabilities. An improved request handling system may therefore be provided by proposed embodiments.

According to another embodiment of the present disclosure, there is provided a computer program product for generating a dispatch datagram, the computer program product comprising a computer readable storage medium having program instructions embodied therewith, the program instructions executable by a processing unit to cause the processing unit to perform a method according to one or more proposed embodiments when executed on at least one processor of a data processing system.

According to another embodiment of the present disclosure, there is provided a computer program product for handling a dispatch datagram comprising a request from a client and an authorization header wrapped together, wherein the authorization header comprises one or more rules for handling the request, the computer program product comprising a computer readable storage medium having program instructions embodied therewith, the program instructions executable by a processing unit to cause the processing unit to perform a method according to one or more proposed embodiments when executed on at least one processor of a data processing system.

According to yet another aspect, there is provided a processing system comprising at least one processor and the computer program product according to one or more embodiments, wherein the at least one processor is adapted to execute the computer program code of said computer program product.

According to another aspect, there is provided a system for generating a dispatch datagram. The system comprises a processor arrangement configured to perform the function of a dispatcher adapted to: receive a request from a client; generate an authorization header based on the received request, wherein the authorization header comprises one or more rules for handling the request; and wrap the received request and the generated authorization header together, thereby generating a dispatch datagram.

According to yet another aspect, there is provided a system for handling a dispatch datagram comprising a request from a client and an authorization header wrapped together, wherein the authorization header comprises one or more rules for handling the request. The system comprises a processor arrangement configured to perform the function of a first validator, the first validator being adapted to provide access to the first service. The first validator is adapted to: receive the dispatch datagram; separate the request and the authorization header from the dispatch datagram; determine whether the first service is authorized to receive the request based on the authorization header; and if the first service is determined to be authorized to receive the request, send only the request to the first service; or if the first service is not determined to be authorized to receive the request, reject the request.

Thus, there may be proposed concepts for generating a dispatch datagram comprising a request and an authorization header wrapped together and handling said dispatch datagram to authorize the request. The authorization header is generated based on the received request by way of a dispatcher and comprises one or more rules for handling the request. The generation of an authorization header individual to each received request provides a means of authorizing requests from a client in a secure manner. For instance, embodiments may provide a means of receiving a request and wrapping said request into a dispatch datagram along with an authorization header. The dispatch datagram may then be sent to a validator associated with a given service and determine whether the service is authorized to receive the request based on the content of the authorization header. Providing such a layered authorization pathway between the request and the relevant service may provide for a more secure manner in which requests can be provided to services in a distributed system.

It is understood that although this disclosure includes a detailed description on cloud computing, implementation of the techniques recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
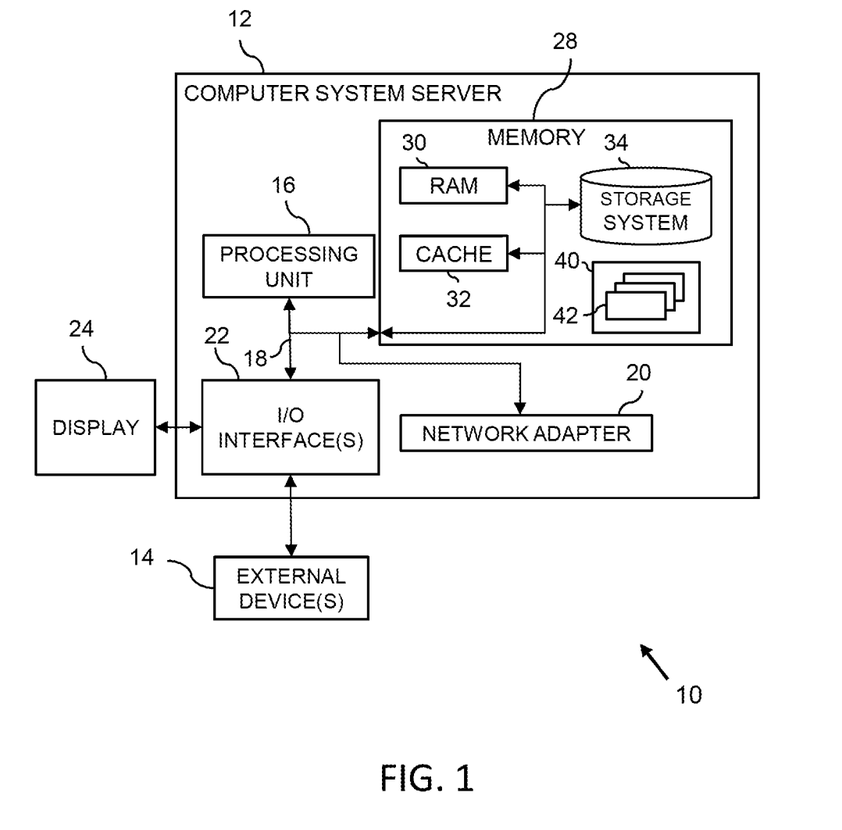
FIG. 1 depicts a cloud computing node, in accordance with embodiments of the present disclosure.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment.

Program modules 42 generally carry out the functions and/or methodologies of embodiments of the disclosure as described herein. For example, some or all of the functions of request handling processes can be implemented as one or more of the program modules 42. Additionally, the request handling processes may be implemented as separate dedicated processors or a single or several processors to provide the functionality described herein. In embodiments, the request handling processes performs one or more of the processes described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to microcode, device drivers, redundant processing units, external disk drive arrays, RAID (redundant array of inexpensive disks or redundant array of independent disks) systems, tape drives, and data archival storage systems, etc.

Figure 2:
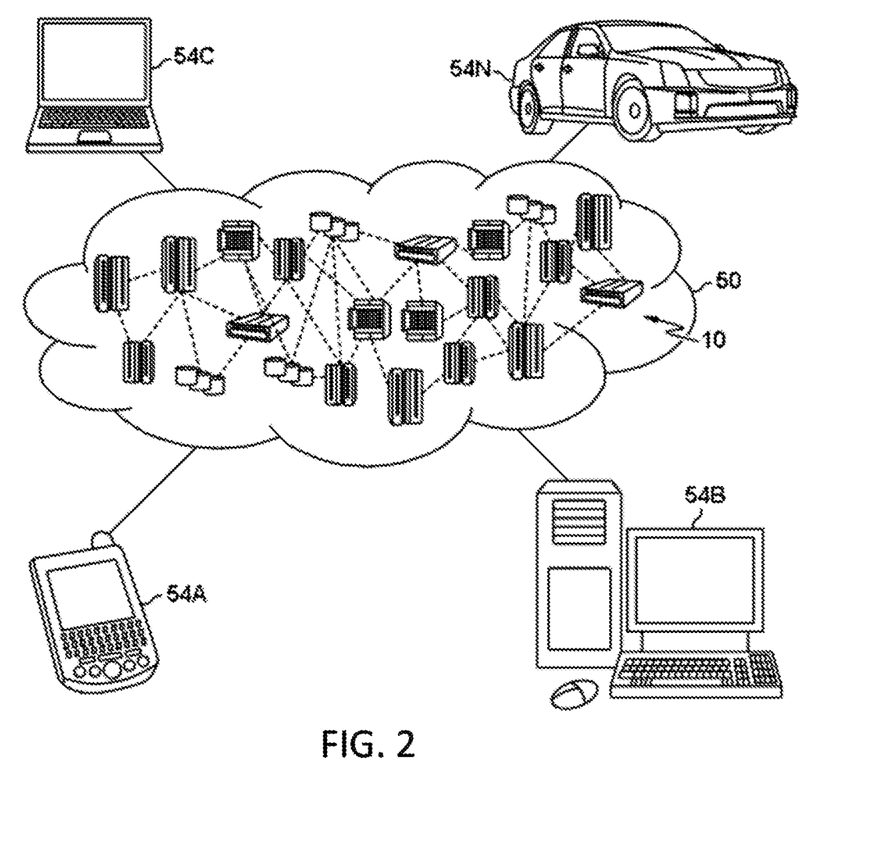
FIG. 2 depicts a cloud computing environment, in accordance with embodiments of the present disclosure.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
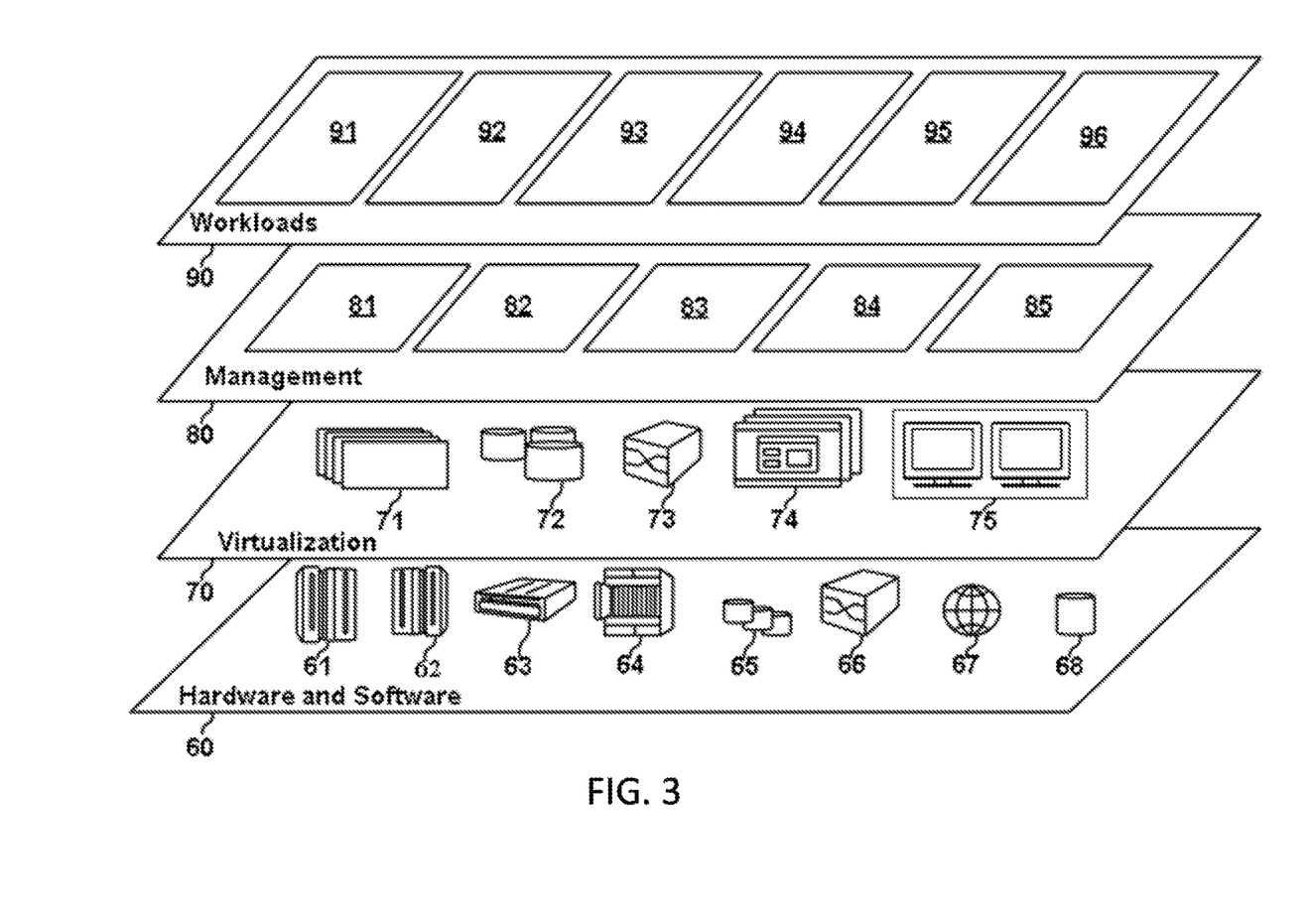
FIG. 3 depicts abstraction model layers, in accordance with embodiments of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage device 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and request handling processes 96 described herein. In accordance with aspects of the disclosure, the request handling processes 96 workload/function operates to perform one or more of the processes described herein.

Figure 4:
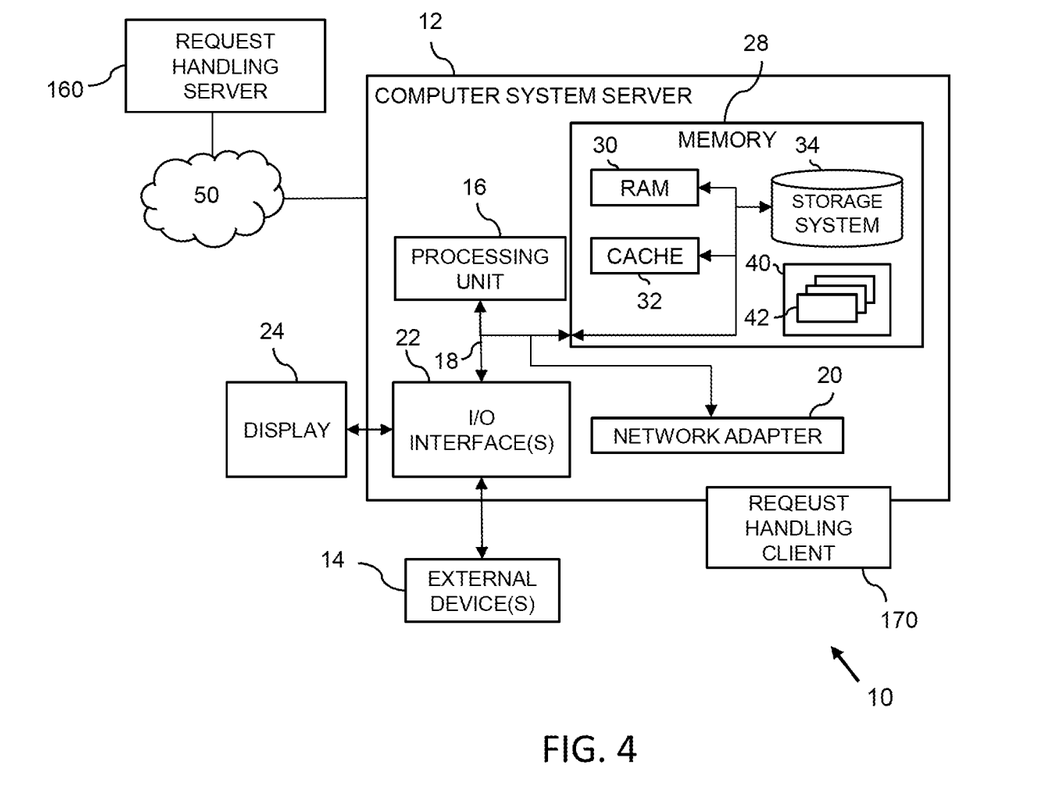
FIG. 4 depicts an example of a cloud computing node, in accordance with embodiments of the present disclosure.

FIG. 4 depicts a cloud computing node according to another embodiment of the present disclosure. In particular, FIG. 4 is another cloud computing node which comprises a cloud computing node 10 that is substantially similar to the cloud computing node 10 shown in FIG. 1. In FIG. 4, the computer system/server 12 also comprises or communicates with a request handling client 170 and a request handling server 160.

In accordance with aspects of the disclosure, the request handling client 170 can be implemented as one or more program code in program modules 42 stored in memory 28 as separate or combined modules. Additionally, the request handling client 170 may be implemented as separate dedicated processors or a single or several processors to provide the function of these tools. While executing the computer program code, the processing unit 16 can read and/or write data to/from memory, storage system, and/or I/O interface 22. The program code executes the processes of the disclosure.

By way of example, request handling client 170 may be configured to communicate with the request handling server 160 via a cloud computing environment 50. As discussed with reference to FIG. 2, for example, cloud computing environment 50 may be the Internet, a local area network, a wide area network, and/or a wireless network. In embodiments of the proposed request handling mechanism, the request handling server 160 may provision data to the request handling client 170. One of ordinary skill in the art would understand that the request handling client 170 and request handling server 160 may communicate directly. Alternatively, a relay agent may be used as an intermediary to relay messages between request handling client 170 and request handling server 160 via the cloud computing environment 50.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
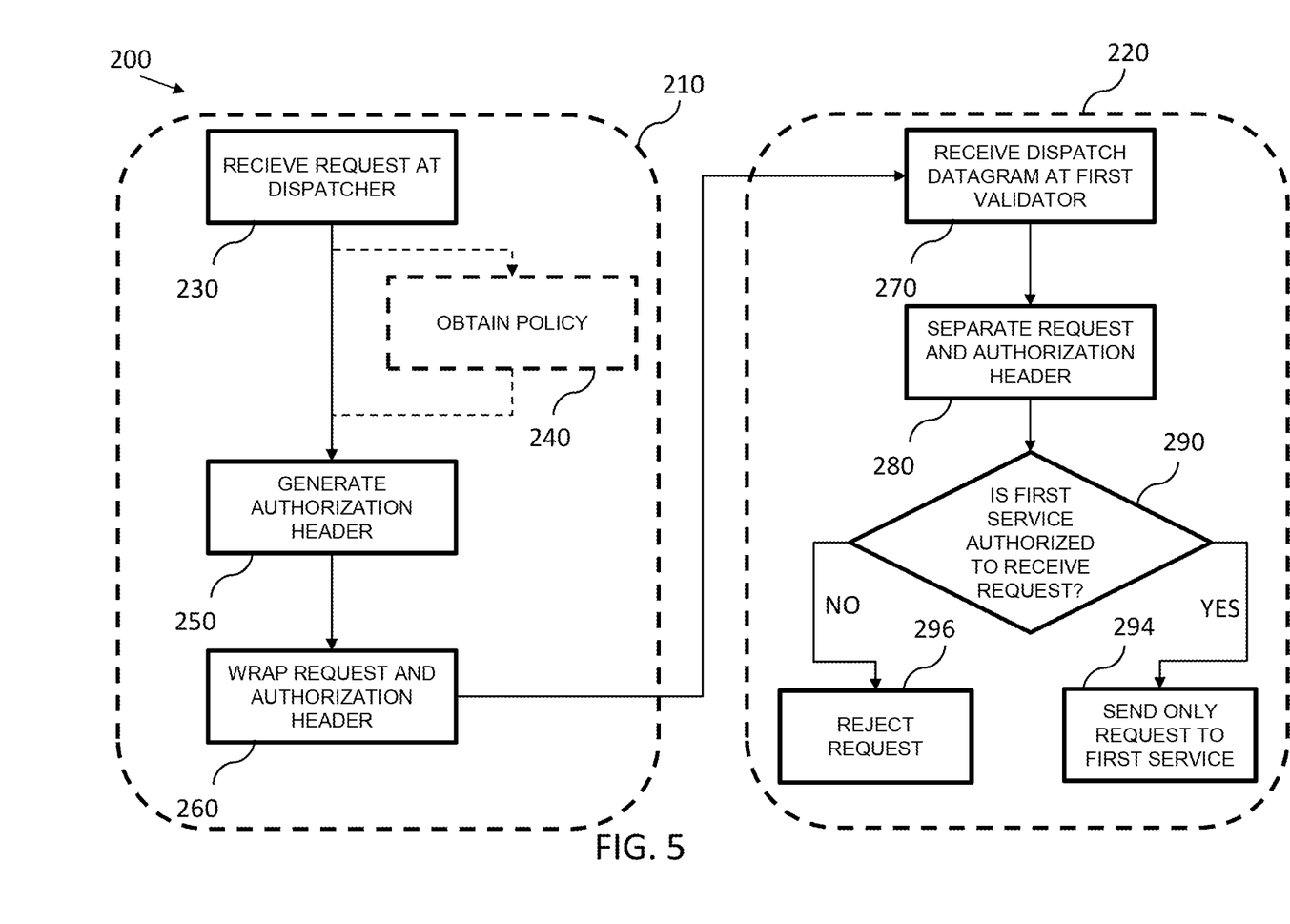
FIG. 5 depicts a flowchart of an example method for handling a request, in accordance with embodiments of the present disclosure.

FIG. 5 illustrates an example of handling a request according to an embodiment. The example embodiment of FIG. 5 may be implemented in the environment of FIGS. 1 and 4, for example. As noted above, the flowchart(s) illustrate the architecture, functionality, and operation of possible implementations of systems, methods, and computer program products as already described herein in accordance with the various embodiments of the present disclosure. The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Referring to FIG. 5, there is depicted simplified diagram of a method 200 for handling a request according to an aspect of the disclosure. In the example shown in FIG. 5, the process of handling a request is separated into two stages. The first stage 210 is directed towards generating a dispatch datagram, and the second stage 220 is directed towards authorizing a request from a user based on the dispatch datagram. It should be noted that, although the processes of generating a dispatch datagram and authorizing a request from a user based on a dispatch datagram are shown as being linked in the example of FIG. 5, both of the processes shown in FIG. 5 may be performed separately and independently of each other. For example, a dispatch datagram may be generated separately and the system, according to an aspect of the disclosure, may be directed only to the authorization of the request based on the contents of the dispatch datagram, i.e., only the second stage shown in FIG. 5, or vice versa.

Looking to the first stage 210 of the method 200 illustrated in FIG. 5, the method may begin in operation 230 by receiving a request from a client at a dispatcher. The request may include any function call initiated by a user to be processed by a service associated with the distributed system. In some cases, the request may comprise a token, which may be validated by way of the dispatcher. For example, the token may be validated by the dispatcher communicating with an authorization server to determine whether the token is valid.

In optional operation 240, a policy may be obtained from a policy database, which may be accessible by the dispatcher. The policy may comprise request permissions that define which services of the distribution are authorized to receive certain requests.

In operation 250, an authorization header comprising one or more rules for handling the request is generated. The one or more rules for handling the request, as defined within the authorization header, may be referred to as the permitted communication topology of the request and may specify, for example, which services of the distributed system call one another. The authorization header is generated before the first service, or any service of the distributed system, is called. The authorization head is honored by the validator component described further below.

If the request comprises a token authorized by the distributor as described above, the generation of the authorization header may further be based on the details of the authorized token. Further, should the method comprise the optional operation 240 wherein a policy is obtained from a policy database, the generation of the authorization header may further be based on the policy information.

In operation 260, the received request and the generated authorization header are wrapped together, thereby generating a dispatch datagram. A datagram is a basic transfer unit associated with a packet-switched network and structured in header and payload sections. In the case of the proposed disclosure, the header of the dispatch datagram comprises the authorization header, and the payload of the dispatch datagram comprises the request. In some examples of the disclosure, the authorization header is unencrypted, and the request is encrypted.

The provision of the authorization header may serve to improve the performance of the distributed system, resulting in lower latency, and to reduce the number of attack vectors on the distributed system due to providing fewer exposures, for example by not relying on JSON Web Tokens in the downstream communications.

Looking to the second stage 220 of the method 200 illustrated in FIG. 5, the second stage of the method may begin in operation 270 by receiving a dispatch datagram at a first validator, the first validator being adapted to provide access to the first service. The dispatch datagram may have been generated according to the methods described above, or by any other means.

In operation 280, the request and the authorization header are separated from the dispatch datagram, and in operation 290 it is determined, by way of the first validator, whether the first service is authorized to receive the request based on the authorization header. If the first service is determined to be authorized to receive the request, only the request is sent to the first service at operation 294, and if the first service is not determined to be authorized to receive the request, the request is rejected by the first validator at operation 296.

In other words, the validator removes the authorization header from the request and validates that the request follows the required communication topology, as defined in the authorization header, to be forwarded to the first service. The validator forwards the request to the service itself. Put another way, a request is only able to reach a service by way of a validator. As will be described below, each downstream request between services may be wrapped with the authorization header for the entire request flow so that, throughout the request flow, the permitted communication topology can be enforced across the distributed system. The authorization header is inaccessible by, i.e., not visible to, the services, thereby reducing the risk of attacks even if a service is compromised.

Figure 6:
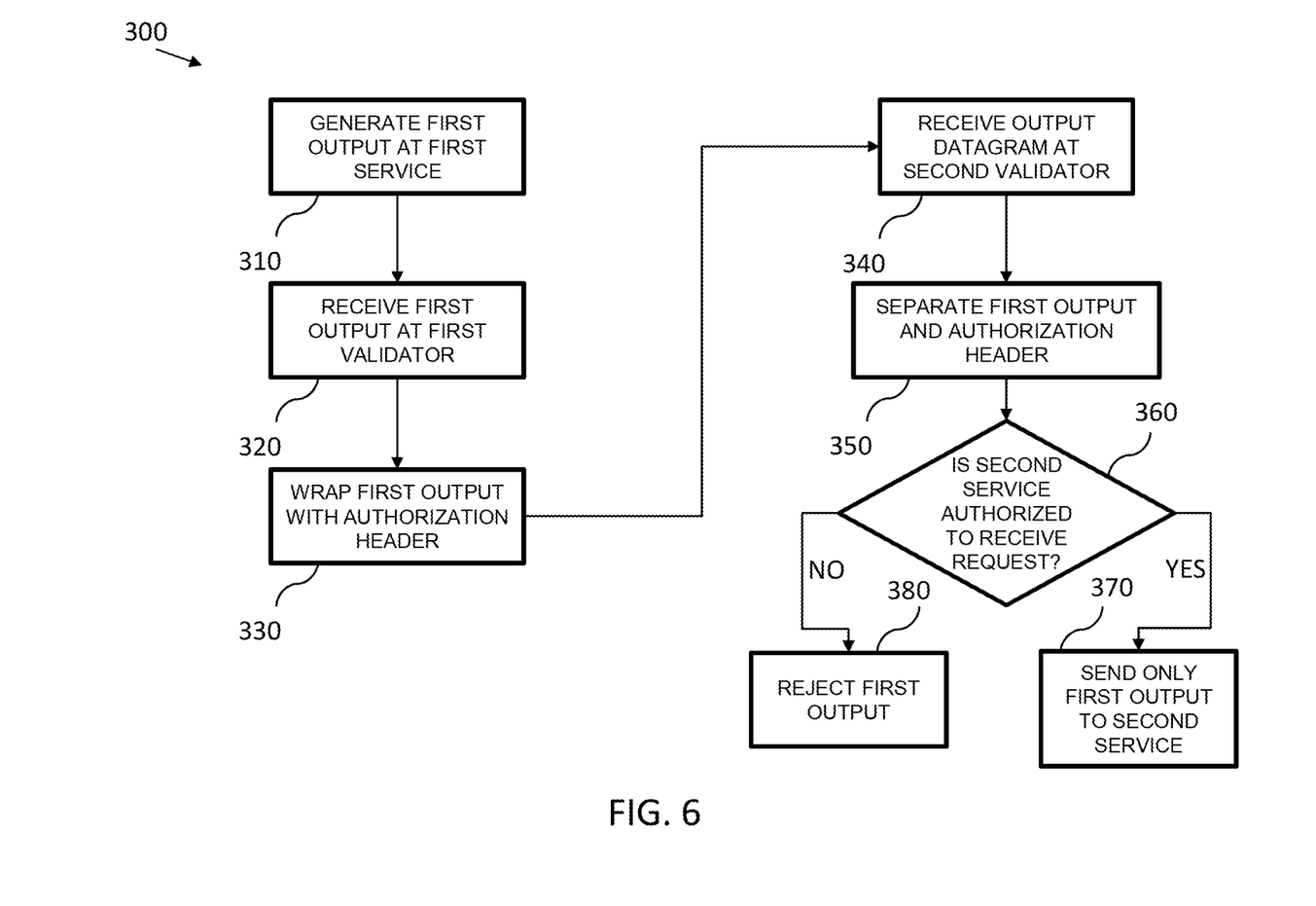
FIG. 6 depicts a flowchart of an example method for handling a request, in accordance with embodiments of the present disclosure.

Referring to FIG. 6, there is depicted a simplified diagram of a method 300 for handling a request according to a further aspect of the disclosure. In particular, FIG. 6 illustrates a continuation of the method described above with reference to FIG. 5, wherein the first service, upon processing the request, generates a first output to be processed by a second service.

The method 300 begins in operation 310 by generating a first output at the first service to be processed by a second service. The first output of the first service is received at the first validator in operation 320 and in operation 330, the first output from the first service is wrapped with the authorization header by way of the first validator, thereby generating an output datagram. Put another way, the output of the first service is rewrapped with the authorization header before being forwarded through the distributed system to a second validator associated with the second service. By providing each service with a separate validator, or using a validation layer, that requires the authorization header of the incoming requests to be valid before forwarding the payload to the relevant service, the security of the distributed system is improved.

In operation 340, the output datagram is received at a second validator, the second validator being adapted to provide access to the second service and in operation 350, the first output and the authorization header are separated from the output datagram.

In operation 360, it is determined whether the second service is authorized to receive the first output based on the authorization header. If the second service is determined to be authorized to receive the first output, only the first output is sent to the second service at operation 370, and if the second service is not determined to be authorized to receive the first output, the first output is rejected at operation 380.

The method 300 illustrated in FIG. 6 provides a demonstration of a single interaction between interlinked services, wherein the output of the first service is wrapped with the authorization header, provided to a second validator, and validated before being forwarded to the second service. It should be noted that such a method may be repeated across any number of services as required according to the nature of the request and the number of processes being called.

Figure 7:
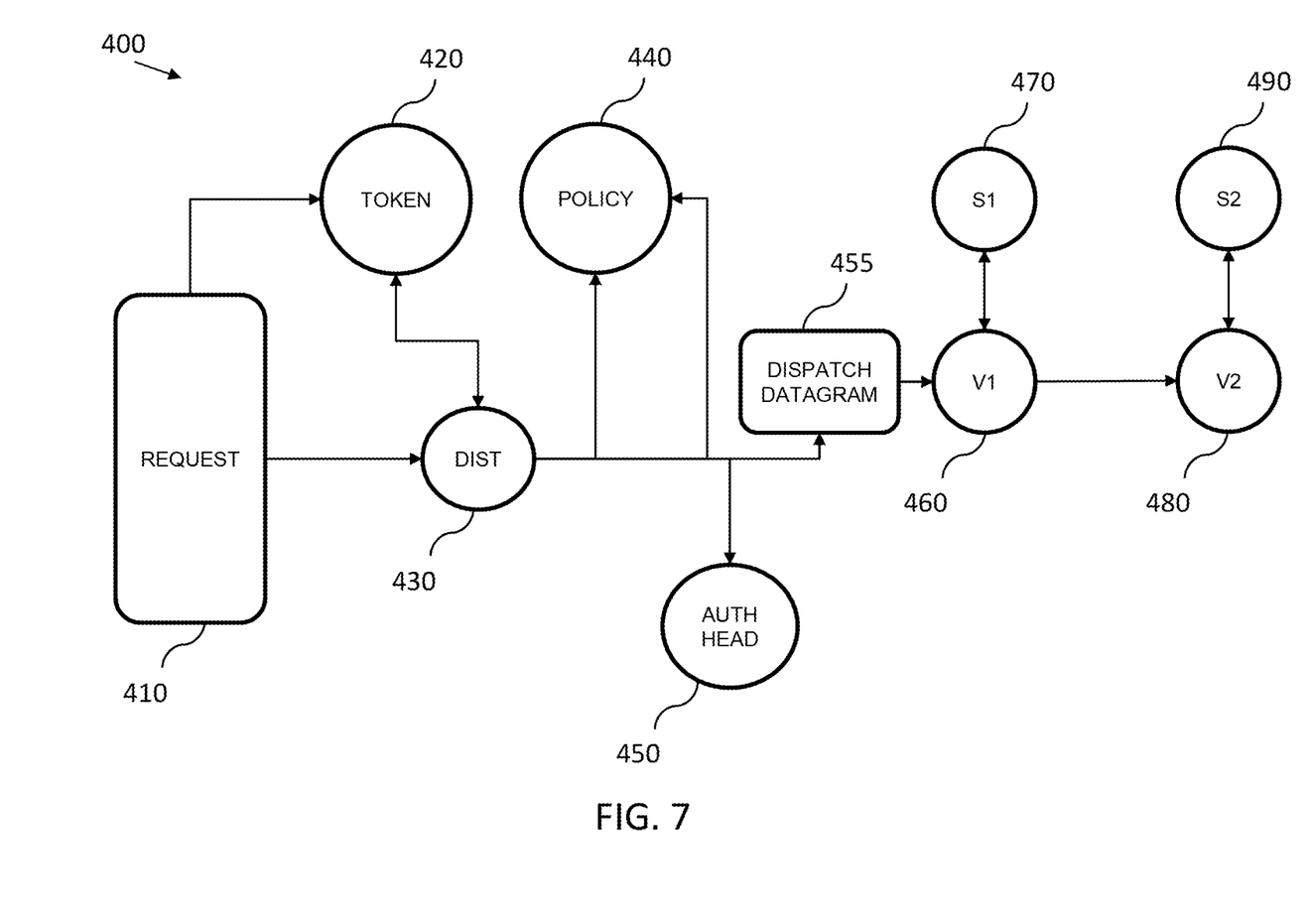
FIG. 7 illustrates a system for handling a request, in accordance with embodiments of the present disclosure.

FIG. 7 shows a simplified schematic representation of a system 400 according to an aspect of the disclosure to provide an illustration of how a request may be handled according to aspects of the disclosure.

Referring to FIG. 7, a request 410 is generated by a user, for example by way of a client application operated by the user. The client application may be any software application accessible by the user by way of a device in communication with the distributed system. In the specific example shown in FIG. 7, the request may be a REST API call, the functionality of which is to access a first service 470. In addition, in the example shown in FIG. 7, the first service 470 is adapted to internally access a second service 490.

The request 410 may be assigned a token, such as a JSON Web Token (JWT) 420, in a similar manner to methods of traditional JWT based authorization techniques. When the request is received at the dispatcher 430, the distributor may communicate with a token authorization server in order to validate that the token of the request is authentic. If the validation of the token with the token authorization server fails, the validator may reject the request. If the token is found to be authentic, then the dispatcher may continue to process the request.

In addition, the distributor may communicate with a Policy Provider to obtain a policy 440 from a provider's policy database. The policy contains permissions for the request. The distributor may fetch a given policy from the Policy Provider based on a parameter of the request. The policy may identify the target service, and other associated services, to receive the request.

Therefore, in the example shown in FIG. 7, the dispatcher 430 may create an authorization header 450 with a policy defining that the request 410 can access a first service 470. In addition, the authorization header may include detailed communication access policies generated by the distributor. For example, the first service may have permission to only call a second service 490 and may not have permission for database access.

If the request 410 is found to be valid, for example by validating the token as described above, the dispatcher 430 wraps the request with the authorization header 450 into a dispatch datagram 455. As discussed above, the authorization header describes which functions/services are within the authorized scope of the request, similar to an allowlist of functions that are permitted to be called as part of the request flow. As used herein, the term "allowlist" refers to a mechanism which explicitly allows some entities to access a particular privilege, service, mobility, or recognition. In other words, it is a list of things that are allowed when everything is denied by default. Put another way, the initial dispatcher, or URL handler, sets the scope of the involved components/services throughout the processing of the request.

The dispatcher 430 passes the dispatch datagram 455 to first service 470. However, each datagram containing a request dispatched to a service is intercepted by a validator. In particular, the dispatch datagram 455 is intercepted by a first validator 460 when dispatched to the first service 470. A validator may be implemented via an envoy sidecar protocol. A validator may be provided next to each service of the distributed system, and each request, or function call, to a service is intercepted by a validator.

The first validator 460 compares the authorization header 450 to the parameters of the first service 470 to verify that the first service fits the authorization given to the request 410. In other words, the first validator determines whether the first service is authorized to receive the request based on the contents of the authorization header. In the case that the first service is authorized to receive the request, the first validator separates the request from the authorization and passes only the request to the first service.

Any subsequent request from the first service 470 will be wrapped with the authorization header once again by the first validator 460 before being passed to the second service 490. In a similar manner to the first validator, the subsequent request is intercepted by a second validator 480, which determines whether the second service 490 is authorized to receive the subsequent request based on the authorization header. This process may be repeated as many times as necessary to complete the processing flow for handling the request.

In summary, the dispatcher 430 creates an authorization header 450, or a network header, similar to a header in front of the request, or an http workload. The authorization header describes which services/functions are within the authorized scope of the request, similar to an allowlist of services that are permitted to be called as part of the request flow.

Each validator looks to the authorization header of a received datagram to check whether the service associated with the given validator is within the authorized scope of the request. The validators strip off the authorization header and hand the payload, or request, to the service for processing. Further, all outgoing traffic from the services will be added to that same authorization header again.

Thus, the authorization of the request is decoupled from the workload, meaning that the services never see the authorization header and the validators of each service perform the authorization check before the request reaches the service. Accordingly, even if a hacker is able to intrude into the service, they are not able to change the authorization header for further traffic because that authorization header is outside of the powers of the function.

Further, the authorization header may not be encrypted, whereas the request may be encrypted. Accordingly, the services may be adapted to decrypt the request upon receipt of the request from the validator. However, the validator may not be adapted to decrypt the request. Thus, the request is not decrypted at the validation layer, meaning that, should the request be intercepted between the validator and the service, the request would still be fully encrypted, thereby improving the security of the system.

It should now be understood by those of skill in the art that, in embodiments of the present disclosure, the proposed request handling concepts provide numerous advantages over conventional request handling approaches. These advantages include, but are not limited to, efficient and accurate request handling means. In embodiments of the present disclosure, this technical solution is accomplished by generating a dispatch datagram comprising a request and an authorization header wrapped together and handling said dispatch datagram to authorize the request.

In still further advantages to a technical problem, the systems and processes described herein provide a computer-implemented method for handling a received request. In this case, a computer infrastructure, such as the computer system shown in FIGS. 1 and 4 or the cloud environment shown in FIG. 2 can be provided, and one or more systems for performing the processes of the disclosure can be obtained (e.g., created, purchased, used, modified, etc.) and deployed to the computer infrastructure. To this extent, the deployment of a system can comprise one or more of:

(i) installing program code on a computing device, such as computer system shown in FIG. 1, from a computer-readable medium;

(ii) adding one or more computing devices to the computer infrastructure and more specifically the cloud environment; and (iii) incorporating and/or modifying one or more existing systems of the computer infrastructure to enable the computer infrastructure to perform the processes of the disclosure.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer implemented method for generating a dispatch datagram, the computer implemented method comprising:

receiving, at a dispatcher, a request from a client, the received request being associated with a first service of a distributed system;

obtaining, at the dispatcher, a policy from a policy database based on a parameter of the received request;

generating, at the dispatcher, an authorization header based on the received request and the policy, wherein the authorization header includes one or more rules for handling the request that specifies which services in the distributed system call one another and the one or more rules including communication access policies;

wrapping, at the dispatcher, the received request and the generated authorization header together to generate the dispatch datagram; and passing, at the dispatcher, the dispatch datagram to the first service via a first validator that authorizes receipt of the received request by the first service by comparing the authorization header to a parameter of the first service to verify that the first service is authorized to receive the request as indicated by the authorization header.

2. The computer implemented method of claim 1, wherein:

the authorization header is unencrypted and specifies which services of the distributed system call one another; and the request is encrypted.

3. The computer implemented method of claim 1, wherein:
the request includes a token, and
the computer implemented method further comprises validating the token.

4. The computer implemented method of claim 3, wherein validating the token includes communicating with an authorization server to determine whether the token is valid.

5. The computer implemented method of claim 4, wherein the generation of the authorization header is further based on the authorized token.

6. The computer implemented method of claim 1, the computer implemented method further comprising:
obtaining the policy from the policy database, wherein the policy includes request permissions.

7. The computer implemented method of claim 1, wherein the generation of the authorization header is individual to each received request.

8. A computer implemented method for authorizing a request from a client, the computer implemented method comprising:
receiving, at a first validator, a dispatch datagram from a dispatcher, wherein the received dispatch datagram includes the request for a first service in a distributed system wrapped together with an authorization header that includes one or more rules for handling the request specifying which services in the distributed system call one another, and wherein the first validator is adapted to provide access to the first service, wherein the first validator exists on a layer outside of the first service to decouple authorization of the request from a workload of the request;
separating the request and the authorization header from the dispatch datagram; and
determining, by the first validator, whether the first service is authorized to receive the request based on a comparison of the authorization header to a parameter of the first service to verify that the first service is authorized by the dispatcher to receive the request as indicated by the authorization header.

9. The computer implemented method of claim 8, wherein:
the dispatch datagram is generated by the dispatcher from the request, wherein the authorization header is generated based on the request and comprises one or more rules for handling the request, and wherein the dispatch datagram is generated by wrapping the request and the authorization header.

10. The computer implemented method of claim 8, the computer implemented method further comprising, in response to the first service being determined to be authorized to receive the request, sending only the request to the first service.

11. The computer implemented method of claim 10, the computer implemented method further comprising, in response to the first service being not determined to be authorized to receive the request, rejecting the request.

12. The computer implemented method of claim 8, wherein the authorization header is inaccessible by the first service.

13. The computer implemented method of claim 8, wherein:
the first service, upon processing the request, generates a first output to be processed by a second service, and the computer implemented method further comprises:
receiving the first output of the first service at the first validator;
wrapping the first output from the first service with the authorization header by the first validator, thereby generating an output datagram;
receiving the output datagram at a second validator, the second validator being adapted to provide access to the second service;
determining whether the second service is authorized to receive the first output based on the authorization header by the second validator.

14. The computer implemented method of claim 13, the computer implemented method further comprising:
separating the first output and the authorization header from the output datagram; and
in response to the second service being determined to be authorized to receive the first output, sending only the first output to the second service.

15. The computer implemented method of claim 14, the computer implemented method further comprising, in response to the second service not being determined to be authorized to receive the first output, rejecting the first output.

16. A computer implemented method for authorizing a request from a client, the computer implemented method comprising:
receiving, at a first validator, the dispatch datagram from a dispatcher, the first validator being adapted to provide access to a first service, and the dispatch datagram having been created by the dispatcher between the client and the first validator, wherein the received dispatch datagram includes the request for the first service in the distributed system wrapped together with an authorization header that includes one or more rules for handling the request specifying which services in the distributed system call one another and the first validator exists on a layer outside of the first service to decouple authorization of the request from a workload of the request;
separating the request and the authorization header from the dispatch datagram;
determining, by the first validator, whether the first service is authorized to receive the request based on comparing the authorization header to a parameter of the first service to verify that the first service is authorized by the dispatcher to receive the request as indicated by the authorization header;
sending only the request to the first service when the first service is determined to be authorized to receive the request; and
rejecting the request when the first service is not determined to be authorized to receive the request.

17. The computer implemented method of claim 16, wherein the first service upon processing the request generates a first output to be processed by a second service, and wherein the computer implemented method further comprises:
receiving the first output of the first service at the first validator;
wrapping the first output from the first service with the authorization header by the first validator, thereby generating an output datagram;
receiving the output datagram at a second validator, the second validator being adapted to provide access to the second service;
separating the first output and the authorization header from the output datagram; and determining whether the second service is authorized to receive the first output based on the authorization header by the second validator.

18. The computer implemented method of claim 17, the computer implemented method further comprising, in response to the second service being determined to be authorized to receive the first output, sending only the first output to the second service.

19. The computer implemented method of claim 17, the computer implemented method further comprising, in response to the second service not being determined to be authorized to receive the first output, rejecting the first output.

20. The computer implemented method of claim 16, wherein the computer implemented method is performed by a processing unit configured to execute program instructions embodied within a computer readable storage medium of a computer program product.

* * * * *